United States Patent
Davis et al.

(10) Patent No.: US 12,335,371 B2
(45) Date of Patent: Jun. 17, 2025

(54) COMMUNICATIONS SYSTEM HAVING CRYPTO-VARIABLE ARRAY AND ASSOCIATED METHODS

(71) Applicant: EAGLE TECHNOLOGY, LLC, Melbourne, FL (US)

(72) Inventors: John M. Davis, Brentwood, TN (US); D. Kevin Faust, Wake Forest, NC (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 656 days.

(21) Appl. No.: 17/586,894

(22) Filed: Jan. 28, 2022

(65) Prior Publication Data

US 2023/0246812 A1   Aug. 3, 2023

(51) Int. Cl.
*H04L 9/08* (2006.01)
*H04L 9/40* (2022.01)

(52) U.S. Cl.
CPC ........ *H04L 9/0819* (2013.01); *H04L 63/0442* (2013.01)

(58) Field of Classification Search
CPC ....... H04W 4/80; H04W 12/50; H04W 12/06; H04W 4/029; H04W 84/18; H04W 76/14;
(Continued)

(56) References Cited

U.S. PATENT DOCUMENTS 7,283,629 B2 * 10/2007 Kaler .................... H04L 9/0891
380/278

8,467,770 B1 * 6/2013 Ben Ayed ............... G06F 21/35
455/411
(Continued)

FOREIGN PATENT DOCUMENTS

| CN | 1972237 A | 5/2007 |
|---|---|---|
| EP | 3262861 B1 | 6/2021 |

(Continued)

OTHER PUBLICATIONS

Li et al., "Mimic Encryption System for Network Security," IEEE Access; vol. 6; Sep. 10, 2018; pp. 50468-50487.
(Continued)

*Primary Examiner* — Sharif E Ullah
(74) *Attorney, Agent, or Firm* — ALLEN, DYER, DOPPELT, GILCHRIST, P.A.

(57) ABSTRACT

A communications system may include a first communications device having a first memory storing a crypto-variable (CV) array having N number of crypto-variables (CVs). A first processor cooperates with the first memory and selects M number of CVs from the CV array, the M number having identifiers associated therewith, generates a key using a cryptographic operation and based upon the selected M number of CVs, generates an encrypted message using the key, and transmits the identifiers of the selected M number of CVs and the encrypted message. A second communications device includes a second memory and the CV array stored therein. A second processor cooperates with the second memory and receives the identifiers for the selected M number of CVs and the encrypted message, generates the key using the cryptographic operation based upon the M number of CVs, and decrypts the encrypted message based upon the key.

21 Claims, 3 Drawing Sheets

(58) Field of Classification Search
CPC ..... H04W 8/005; H04W 84/12; H04W 12/63;
H04W 76/11; H04L 67/12; H04L
63/0861; H04L 63/08; H04L 12/2807;
H04L 12/2814; H04L 63/0823; H04L
65/1036; H04L 65/4084; H04L 63/083;
H04L 63/0884; H04L 67/10; H04L
9/0819; G06F 21/35; G06F 3/04817;
G06F 21/32; G06F 3/04842; G06F 21/34;
G06F 3/0482; G06F 13/382; G06F
16/685; G06F 21/44
USPC ........ 713/150, 163, 171, 181; 726/2, 21, 36;
380/255, 264, 276
See application file for complete search history.

(56) References Cited

U.S. PATENT DOCUMENTS

| | | | | |
|---|---|---|---|---|
| 9,026,053 | B2* | 5/2015 | Molettiere | A61B 5/112 |
| | | | | 455/41.2 |
| 10,178,549 | B2* | 1/2019 | Palanigounder | H04L 9/085 |
| 11,520,870 | B2* | 12/2022 | Xia | H04L 63/083 |
| 2006/0199537 | A1* | 9/2006 | Eisenbach | G06F 21/6245 |
| | | | | 455/41.2 |
| 2009/0222910 | A1* | 9/2009 | Le Bihan | H04L 9/3273 |
| | | | | 726/19 |
| 2011/0314153 | A1* | 12/2011 | Bathiche | H04W 12/06 |
| | | | | 709/225 |
| 2013/0268758 | A1* | 10/2013 | Schrecker | H04W 12/069 |
| | | | | 713/168 |
| 2014/0047237 | A1* | 2/2014 | Parrish | H04L 9/065 |
| | | | | 713/168 |
| 2014/0165090 | A1* | 6/2014 | Andreasen | H04L 63/0815 |
| | | | | 725/25 |
| 2016/0234758 | A1* | 8/2016 | Qi | H04W 48/14 |
| 2018/0139190 | A1* | 5/2018 | Chaum | G09C 1/00 |

FOREIGN PATENT DOCUMENTS

| | | |
|---|---|---|
| WO | 2015/056236 | 4/2015 |
| WO | 2019/106451 | 6/2019 |

OTHER PUBLICATIONS

Schaad et al., "Request for Comments: 3394—Advanced Encryption Standard (AES) Key Wrap Algorithm," Soaring Hawk Consulting and RSA Laboratories; Sep. 2002; pp. 1-41.

* cited by examiner

COMMUNICATIONS SYSTEM HAVING CRYPTO-VARIABLE ARRAY AND ASSOCIATED METHODS

FIELD OF THE INVENTION

The present invention relates to the field of communications systems, and, more particularly, to communications systems that generate encrypted messages and related methods.

BACKGROUND OF THE INVENTION

Encryption key agreement in data communications may use a fixed key, which is insecure over time and insecure to store persistently, or may use a session oriented key that changes keys over different cryptographic periods. These encryption systems have some drawbacks when used in advanced communication systems. For example, a pre-shared key (PSK) uses manual, out-of-band, key updates for over-the-air rekeying. A password-based-key-derivation function (PBKDF) uses external input from a user, while a session key agreement protocol uses preliminary transactions that increase the time and overhead to initiate communications. Some high latency, low bandwidth two-way radios or unattended devices may have difficulty implementing more agile transactional keying systems for encryption security.

Some communication systems encrypt data using symmetric algorithms, such as the Advanced Encryption Standard (AES) to provide confidentiality, and optionally, enhance the integrity and authentication of the communications. To reduce the chances for breaking the encryption, some communications systems use ephemeral keying that requires a reasonable cryptographic period, i.e., a key lifetime, which may be supported by cryptographically strong entropy sources that enhance diversity of the data generating function and make it more random, thus making meaningful encryption patterns difficult to ascertain. Some session key agreement protocols may use asymmetric elliptic curve or finite-field algorithms, and incorporate integral endpoint random number generators to create the crypto-variables used for an encrypted session between endpoints.

More traditional data communications may be internet protocol (IP) based, and include reasonably low latency, high bandwidth, and a key agreement scheme, such as the Internet Security Association and Key Management Protocol (ISAKMP) for Internet Protocol Security (IPSec) or Transport Layer Security (TLS). These encryption systems, however, use "handshakes" that are virtually transparent to the end-user, but add considerable overhead to the communications system. Low bandwidth, high latency systems are useful, especially in technical or specialized communications, or in challenged medium environments. The low probability of intercept and low probability of detection (LPI/LPD) helps avoid the extra emissions used for a crypto-handshake. The asymmetric cryptography used with many current session key agreement protocols, however, may not be quantum safe. There is a need for a trusted ad-hoc key agreement protocol for endpoints with unintended loss and that may employ a Perfect Forward Security (PFS) to add back-traffic protection and make quantum resistant cryptography that would avoid the use of traditional public key encryption systems.

SUMMARY OF THE INVENTION

In general, a communications system may include a first communications device comprising a first memory having stored therein a crypto-variable (CV) array having N number of crypto-variables (CVs). A first processor may cooperate with the first memory and may be configured to select M number of CVs from the CV array, the M number of CVs having identifiers associated therewith, generate a key using a cryptographic operation, based upon the selected M number of CVs, generate an encrypted message using the key, and transmit the identifiers of the selected M number of CVs and the encrypted message. A second communications device may comprise a second memory having stored therein the CV array. A second processor cooperates with the second memory and is configured to receive the identifiers for the M number of CVs and the encrypted message, generate the key using the cryptographic operation based upon the M number of CVs, and decrypt the encrypted message based upon the key.

The first processor may be configured to obtain a mixkey and generate the encrypted message further using the obtained mixkey. The second processor may be configured to decrypt the encrypted message further based on the obtained mixkey. The first processor may be configured to generate a successor mixkey using the cryptographic operation, and the second processor may be configured to generate the successor mixkey using the cryptographic operation and the obtained mixkey. The first processor may be configured to delete the mixkey upon loss of power, and the second processor may be configured to delete the mixkey upon loss of power. The first processor may be configured to generate the mixkey based upon a mixkey sequence value and transmit the mixkey sequence value to the second processor, and the second processor may be configured to generate the mixkey based upon the mixkey sequence value.

In another example, the first processor may be configured to select different M numbers of CVs from the CV array for each communication session. The first communications device may comprise an Internet of Things (IOT) control device and the second communications device may comprise an IOT device. The first communications device may comprise a first wireless transceiver coupled to the first processor, and the second communications device may comprise a second wireless transceiver.

Another aspect is directed to a communications method that may comprise operating a first communications device that may comprise a first memory having stored therein a crypto-variable (CV) array having N number of crypto-variables (CVs), and a first processor cooperating with the first memory to select M number of CVs from the CV array, the M number of CVs having identifiers associated therewith, generate a key using a cryptographic operation and based upon the selected M number of CVs, generate an encrypted message using the key, and transmit the identifiers of the selected M number of CVs and the encrypted message. The method may include operating a second communications device comprising a second memory having stored therein the CV array, and a second processor cooperating with the second memory to receive the identifiers for the M number of CVs and the encrypted message, generate the key using the cryptographic operation based upon the M number of CVs, and decrypt the encrypted message based upon the key.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
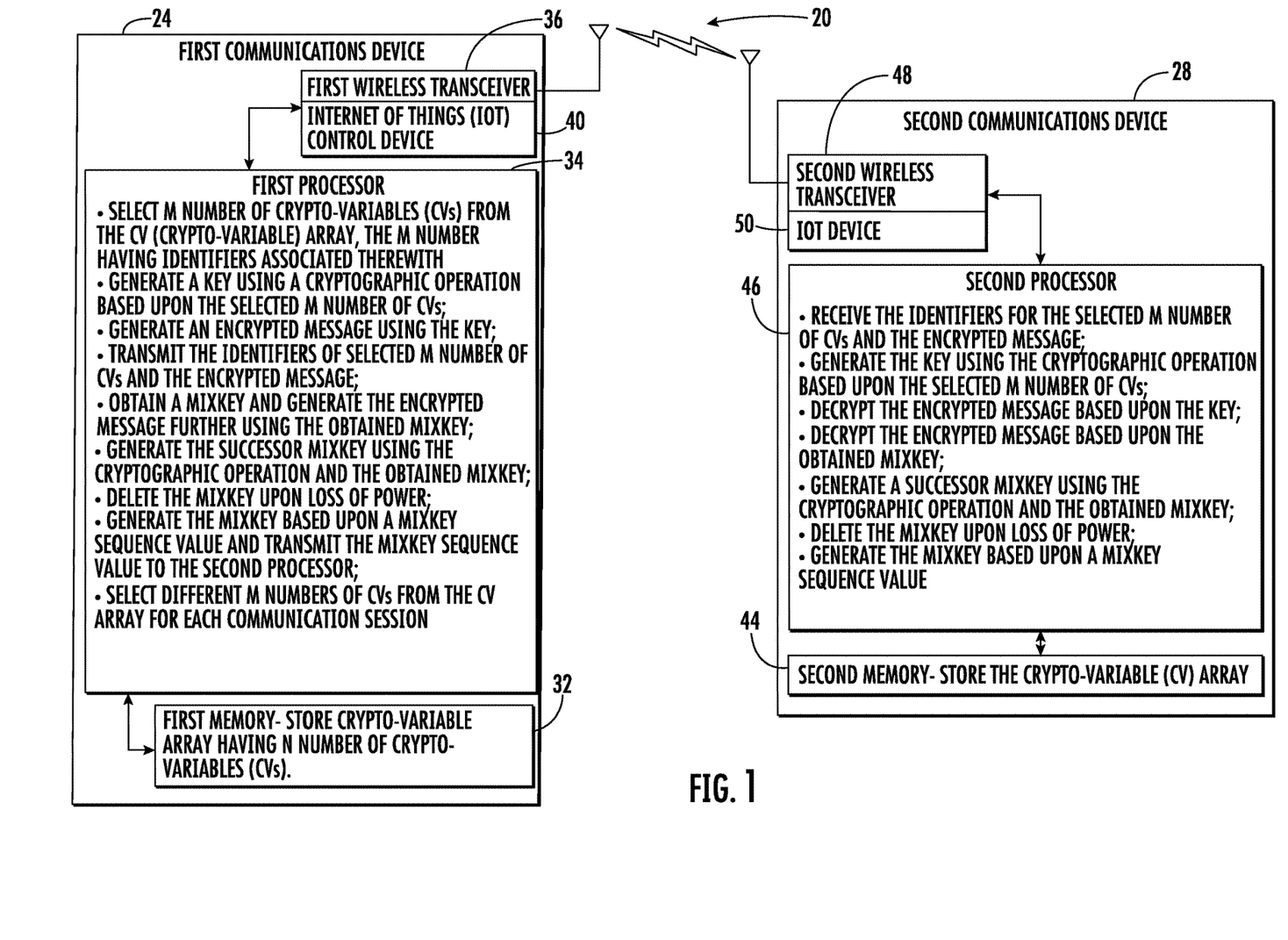
FIG. 1 is a block diagram of the communications system showing the first and second communications devices having first and second memories that each store a crypto-variable (CV) array in accordance with a non-limiting example.

Referring initially to FIG. 1, a communications system is illustrated generally at 20 and shows a first communications device 24 and second communications device 28. The first communications device 24 includes a first memory 32 having stored therein a crypto-variable (CV) array having N number of crypto-variables (CVs). A first processor 34 cooperates with the first memory 32 and is configured to select M number of CVs from the CV array, the M number of CVs having identifiers associated therewith, generate a key using a cryptographic operation and based upon the selected M number of CVs, generate an encrypted message using the key, and transmit the identifiers of the selected M number of CVs and the encrypted message. In an example, the first communications device 24 includes a first wireless transceiver 36 coupled to the first processor 32 that transmits the identifiers of the selected M number of CVs and an encrypted message. In another example, the first communications device 24 may comprise an internet of things (IOT) control device 40.

The first processor 34 may be configured to obtain a mixkey and generate the encrypted message further using the obtained mixkey. In a non-limiting example, the first processor 34 may be configured to generate a successor mixkey using the cryptographic operation and the obtained mixkey. The first processor 34 may delete the mixkey upon loss of power. In another example, the first processor 34 may generate the mixkey based upon a mixkey sequence value and transmit the mixkey sequence value via the first wireless transceiver to the second communications device 28. The first processor 34 may also be configured to select different M numbers of CVs from the CV array based upon a time schedule, such as selecting different M numbers of CVs from the CV array for each communication session, or selecting different M numbers of CVs from the CV array, such as over a period of minutes or hours according to communication encryption needs.

The second communications device 28 includes a second memory 44 having stored therein the CV array. A second processor 46 cooperates with the second memory 44 and is configured to receive via a second wireless transceiver 48 the identifiers for the M number of CVs and the encrypted message from the first communications device 24 and generate the key using the cryptographic operation based upon the M number of CVs. The second processor 46 decrypts the encrypted message based upon the key. The second processor 46 may also be configured to decrypt the encrypted message further based on the obtained mixkey and generate a successor mixkey using the cryptographic operation and the obtained mixkey. The second processor 46 may also delete the mixkey upon loss of power and generate the mixkey based upon the mixkey sequence value as received from the first communications device 24.

In an example, the second communications device 28 may include an IOT device 50 and receive the communications data, including any encrypted messages and mixkey sequence value from the first communications device 24. In an example, the CV array and the mixkey may be stored within the first and second memories 32,44 at the time of provisioning of the respective first and second communications devices 24,28. At each system initialization for each communications devices 24,28, the mixkey may be read from a non-volatile storage as part of the respective first and second memories 32,44 and placed in a volatile Read Access Memory (RAM) for operational use. The final encryption key may be created from an XOR logic operation of the key generated from the cryptographic operation based upon the selected M number of CVs and the mixkey, which also may be generated via the same cryptographic function. Other logical or non-expansion functions may be used instead of the XOR logic function to create the final encryption key.

Use of the mixkey provides a better Perfect Forward Secrecy (PFS), and enables anti-tamper protection to provide a mechanism to protect back-traffic from compromise, even if one of the first or second communications devices 24,28 is compromised and an intruder determines the CV array. Based upon any intervening communications that may have been recorded between the two communications devices 24,28, it may otherwise be possible to determine any keys and unencrypt the communications.

In an example, the mixkey serves as an encryption mechanism to key exposure since it has an ephemeral nature. An active mixkey may be a component in the final encryption key creation and is irretrievably replaced, and exists only in the volatile section of the first and second memories 32,34. For that reason, the mixkey is externally irretrievable by software or hardware mechanisms and ceases to exist in an invasive attack. Even though the mixkey is secret and mutative, it may be readily synchronized with another communications device, and thus, shared using a common starting point, update protocol, and update value between different endpoints in a communications network.

The mixkey may also act as an exclusion key when implemented as a device specific key with either first or second communications devices 24,28. This allows the same type of protocol within an N number of CVs, and an N number of selected CVs from the CV array to be used in a network broadcast that broadcasts payloads using common keys without a mixkey (for the device specific mixkey), yet send other payload traffic over the broadcast network with a device specific mixkey to exclude other network components and N devices from decryption of any plaintext.

Different cryptographic operations may be used to generate the key and mixkey. One example is the Advanced Encryption Standard (AES) that uses a substitution-permutation function as a series of linked operations that replaces inputs by specific outputs and substitutes and shuffles bits around via permutations. The AES treats 128 bits of plaintext as a block for 16 bytes, which may be arranged in four columns and four rows for processing as a matrix. The AES may use different rounds depending on the length of the key, such as 10 rounds for 128-bit keys, 12 rounds for 192-bit keys, and 14 rounds for 256-bit keys. The mixkey provides Perfect Forward Secrecy with an enhanced protection to protect session keys. In this example, it is possible to create a 4 byte (32 bit) as an M-number of CVs from the CV array, which may be forwarded from the first communications device 24 to the second communications device 28 in a separate channel or prepended to the message payload.

For example, the first and second communications devices 24,28 may share a 256×256 bit CV array generated from a cryptographically secure random number generator, and the array rows may be indexed by 8 bit identifiers (00-FF). The first communications device 24 may select four CVs at random, concatenate the 256 bit strings into a 1024 bit string, and run a SHA-256 hash to produce a 256 bit key. This key may be used to perform an AES-256 GCM (Galois/counter mode) or other mode encryption on the payload. Four byte index numbers of the four 256 bit CVs may be prepended to the payload ciphertext (CT), which is transmitted to the second communications device 28. It could also be communicated out-of-band or inferred from external conditions, such as time-of-day and other factors.

The second communications device 28 looks up the CV values based on the 4 byte index field for the selected M number of CVs, reconstructs the AES key, and decrypts the AES GCM mode ciphertext when the AES-256 GCM encryption mode is used. A time related variable may be used as part of the key generation. It is possible to maintain a table of used permutations to ensure no session keys are reused. The index may be referenced to reuse the key for persistent sessions over a crypto period. Boot time protections may also be used to protect the CV array from disclosure. The use of the CV array provides quantum resistant keying and on-the-fly session unique, high entropy keys without using a handshake, and may provide in this example 4.2 billion unique permutations of session keys.

Different Internet of Things (IOT) devices, such as the IOT control device 40 and IOT device 50 of respective first and second communication device 24,28 may be incorporated within the communications system 20, including different sensors with embedded systems and machine learning. This includes "smart home" devices and appliances such as lighting fixtures, thermostats, home security systems, cameras, water meters, and home appliances that could be controlled via the IOT control device 40 at the first communications device 24. The communications system 20 may provide additional privacy and security for Internet of Things devices. Enabling technologies for Internet of Things devices may include short-range wireless devices with Bluetooth mesh networking, near-field communications, radio frequency identification, WiFi, Zigbee and other communication protocols. It may include LTE-advanced and 5G communications networks, low power wide area networking and very small aperture terminal (VSAT) satellite communications. The communications system 20 may also include Ethernet power-line communications.

Figure 2:
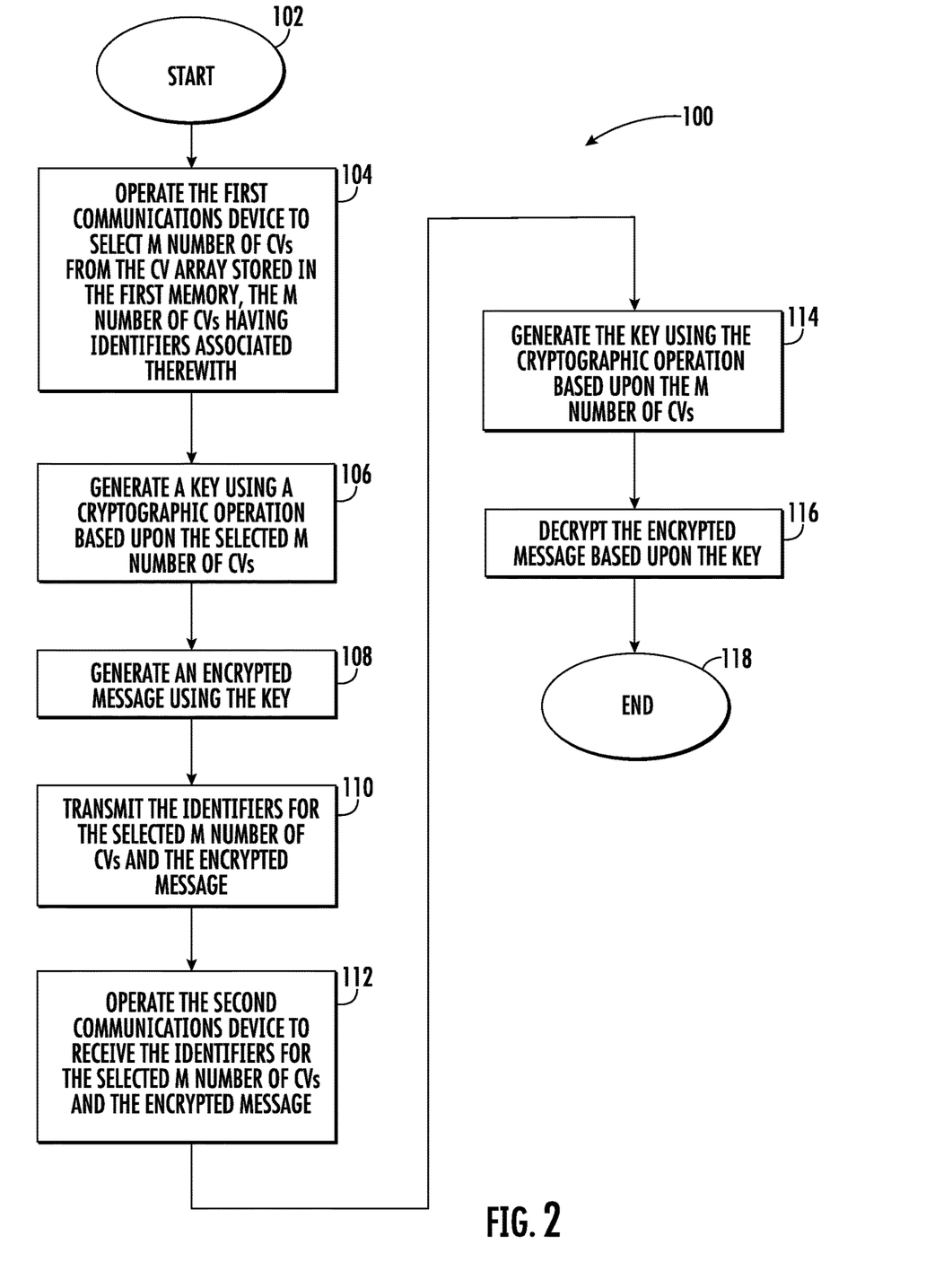
FIG. 2 is a high-level flowchart showing a method of operating the communications system of FIG. 1.

Referring now to FIG. 2, a high-level flowchart of a communications method used for operating the communications system 20 of FIG. 1 is illustrated generally at 100. The process starts (Block 102) and the first communications device 24 is operated to select M number of CVs from the CV array stored in the first memory 32, the M number of CVs having identifiers associated therewith (Block 104). The first processor 34 generates a key using a cryptographic operation and based upon the selected number of CVs (Block 106). An encrypted message is generated using the key (Block 108) and the identifiers of the selected M number of CVs and the encrypted message are transmitted (Block 110). The second communications device 28 is operated to receive the identifiers for the selected M number of CVs and the encrypted message (Block 112). The key is generated using the cryptographic operation based upon the M number of CVs (Block 114) and the encrypted message decrypted based upon the key (Block 116). The process ends (Block 118).

The use of the mixkey (MK) provides a Perfect Forward Secrecy (PFS) update for the quantum resistant (QR) communications system 20 and has practical cryptographic implementations for ESBD (Enhanced Short Burst Data) and GDB (GNU project debugger communications. The communications system 20 safely exchanges keys for progressive crypto periods without traditional PKI exchanges. In an example, the communications system 20 may incorporate a metadata message that includes the M number of CVs, allowing each end party to independently derive the same key. An example of this key derivation process is outlined below, which on a high level may be referred to as an N choose M key derivation.

The quantum resistant (QR) N-Choose-M (NCM) key derivation process used by the communications system 20 selects seed values of random numbers and performs a cryptographic operation to arrive at a unique encryption key. It also provides Perfect Forward Secrecy (PFS) and enables anti-tamper protection through the introduction of the mixkey. The PFS protection protects back-traffic from compromise, even when endpoint secrets in the crypto-system have been determined and compromised.

The NCM process selects a set of input parameters from a shared set of generated random bit fields that are operated on using in this example RFC 3394, "AES Key Wrap" to perform a key derivation function (AES key update), e.g., a 256-Choose-4 process with AES key wrap as a key update mechanism for key creation. The N and M values can be any integer, and any one-way cryptographic compression function may be used for key creation.

A participating cryptographic system holds a group of "seed keys" as crypto-variables (CVs) to create a "SEED-SET" Master, referred to also as the crypto-variable (CV) array. Each of these individual seed keys as CVs is a randomly generated and unique value of equal size to the final encryption key. The CVs in the CV array are secret values pre-placed in the communication devices 24,28 for the life of the communications system 20, though there can also be a mechanism to update them in-band or out-of-band. The values of these CVs are held in the CV array as a 256-bit column by 256-bit row array shown schematically in FIG. 3 at 200.

Figure 3:
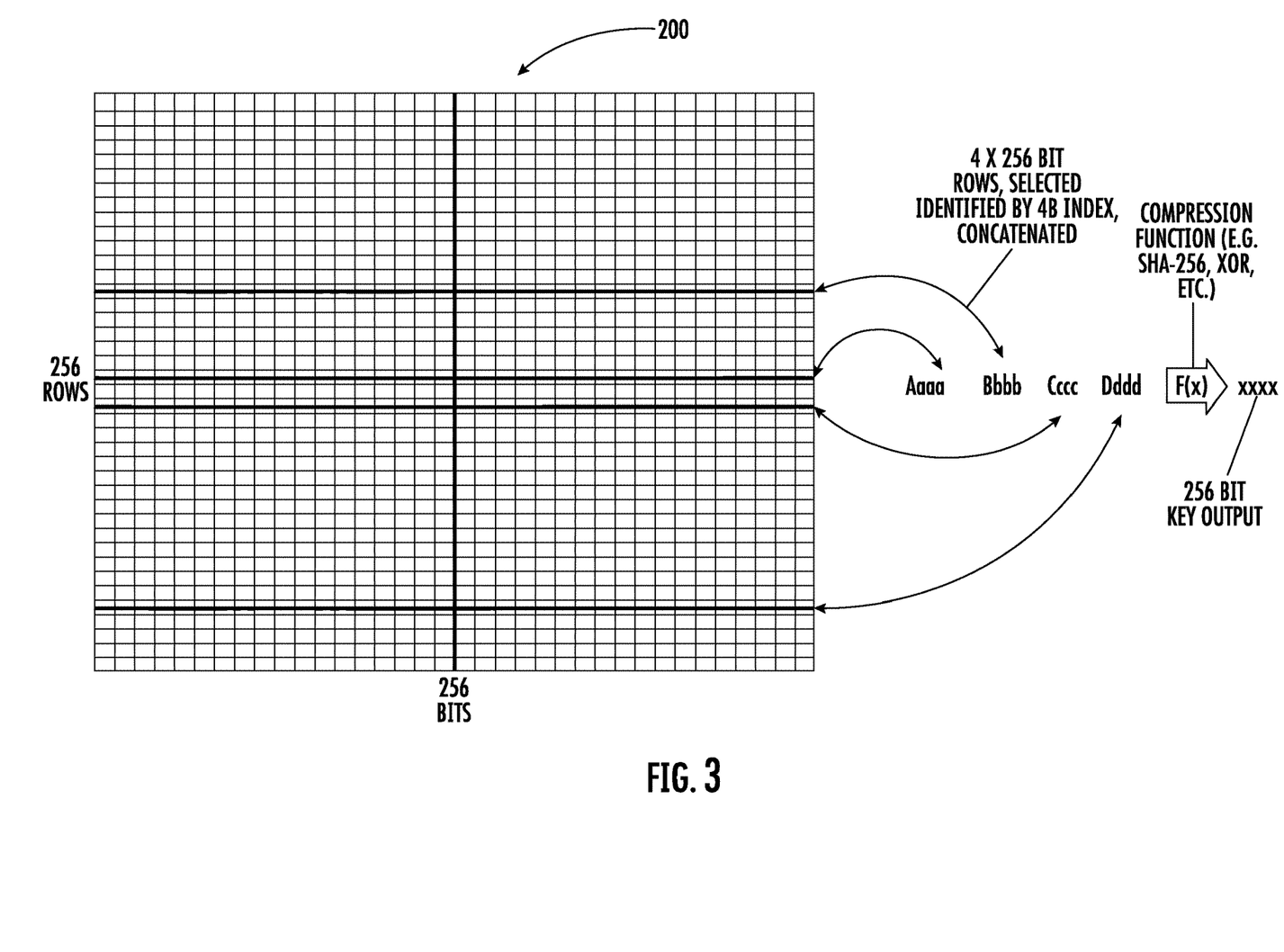
FIG. 3 is a schematic diagram of an example of the CV array and showing crypto-variables (CVs) selected from the CV array.

The key exchange algorithm is replaced with a meta-key exchange, i.e., an exchange of index four 8-bit values enumerating the location addresses (or index values), and order, of seed keys as CVs to derive the target encryption key. This 32-bit value may be called the cryptographic value index, or CVI. Other descriptors could be contained within the meta-exchange (e.g., initialization vector value, key lifetime, etc.). Once the meta-exchange is delivered to the distant end as another or second communications device 28, each participant or endpoint calculates a common Traffic Encryption Key (TEK) as the final key used for encrypting the plaintext and generate the encrypted message using the key.

In this example, the SEEDSET Master is a group of 256 Seed keys pre-placed in the system as the CV array 200 shown in FIG. 3. To derive the next Traffic Encryption Key as a non-limiting example, an example algorithm is: Choose 4 of the possible 256 Seed keys (CVs) (no duplicates) from the CV array 200, which in this example are shown as Aaaa, Bbbb, Cccc, and Dddd in FIG. 3 as seed keys or CVs. There are 256 choose 4 (approximately 4 billion) possible outcomes of this process. The randomness of the choice is entropy beneficial and is based on random bits provided by a trusted Random Number Generator (RNG) of the sender as the first communications device 24. This set of the selected seed keys may also be referred to as a SEEDSET. A selected member of this seed set may also be called a member-seed or CV.

The process at the first communications device 24 computes a single SHA 256 hash using all member-seeds (CVs) in the SEEDSET as if they were concatenated into one long bit string. They may be concatenated in the order they are chosen by the RNG. All member-seeds as CVs may be included in the SHA 256 hash. Because this process may be repeated many times, this hashing contributes to ensuring that any SEEDSETs as CVs with overlapping membership will have uncorrelated hash value outputs unless the SEEDSETs are identical. A single SHA 256 output as an example key may be called the KEYUPDATESEED.

As an example, the first processor 34 at the first communications device 24 performs an AES KEY DERIVATION on the KEYUPDATESEED according to RFC 3394, with the following exceptions. The input key and wrap key may both be the KEYUPDATESEED. The variable "A" will be 64 MSB bits from the SHA 256 hash of the KEYUPDATESEED concatenated with the CVI. The 64 bits for "A" serve to compensate for the expected, non-empty intersection of SEEDSETs during the communications system 20 lifetime. The output of the AES operation is the TEKSEED or key value derived from the use of the M number of CVs from the CV array 200. Thus, NCM is a modified implementation of RFC 3394 as follows:

Inputs: Plaintext, n 64-bit values {P1, P2, . . . , Pn}, and Key, K (the KEK).
Outputs: Ciphertext, (n+1) 64-bit values {C0, C1, . . . , Cn}.

The process is as follows:
1) Initialize variables:
    Set A=IV, an initial value
    For i=1 to n
        R[i]=P[i],
2) Calculate intermediate values:
    For j=0 to 5
        For i=1 to n
            B=AES(K, A|R[i])
            A=MSB(64, B)^t where t=(n*j)+i
            R[i]=LSB(64, B), and
3) Output the results:
    Set C[0]=A
    For i=1 to n
        C[i]=R[i];
where the values are defined as:

| | |
|---|---|
| AES(K, W) | Encrypt W using the AES codebook with key K |
| AES-1(K, W) | Decrypt W using the AES codebook with key K |
| MSB(j, W) | Return the most significant j bits of W |
| LSB(j, W) | Return the least significant j bits of W |
| B1 ^ B2 | The bitwise exclusive or (XOR) of B1 and B2 |
| B1 \| B2 | Concatenate B1 and B |
| W | The KEYUPDATESEED |
| K | The KEYUPDATESEED |
| n | The number of 64-bit key data blocks |
| s | The number of steps in the wrapping process, s = 6n |
| P[i] | The ith plaintext key data block |
| C[i] | The ith ciphertext data block |
| A | 64 MSB bits from the SHA-256 hash of the KEYUPDATESEED concatenated with the CVI |
| R[i] | An array of 64-bit registers where i = 0, 1, 2, . . . , n |
| A[t], R[i][t] | The contents of registers A and R[i] after encryption step t. |
| IV | The 64-bit initial value used during the wrapping process. |

The metadata key exchanges may be transmitted as a plaintext message prior to initiating encrypted communications, or inserted as a transitional exchange, and may be covered using the expiring TEK (Traffic Encryption Key) as the final key derived from the M CVs as a trigger to move to the next key. In some implementations, it could be routine to roll keys at the end of each information exchange or session and minimize risk.

If the Master SEEDSET as the CV array 200 is compromised, and metadata key exchanges are in the clear, there may be potential for compromise of previously used keys, unless there is some mechanism to ensure endpoint secrecy. The use of the mixkey (MK) provides for enhanced security in the master SEEDSET as the CV array 200. The use of the mixkey provides back traffic protection despite physical compromise of the system platform. The mixkey is updateable.

At time of provisioning of the CV array 200 on the communications system 20, a 256-bit mixkey (MK) is defined and the original N variant value is stored in a non-volatile section of each memory 32,44, such as with the first and second communications devices 24,28. At initialization of each communications device 24,28, the mixkey (MK) is read from a non-volatile storage section of memory 32,44 and placed in volatile RAM for operational use. The TEK as the final Traffic Encryption Key is created from the XOR logic function of the "TEKSEED" as the key derived from the NCM process, generated via the AES function outlined above, and the mixkey.

The present value (N) is updated using the AES key-update, and the N+1 resulting value is overwritten to the MK NVRAM location, where it will be used operationally upon the next boot of a communications device 24,28. In this manner, if reasonable system protections present physical data access without causing a system reset, any previous keys and ciphertext are protected from compromise. Using a defined protocol, the sender, such as the first communications device 24, may communicate a mixkey update value (MUV), also referred to as a mixkey sequence value, to the recipient, such as the second communications device 28, to ensure key synchronization. The successive MK updates are computed using a variation of the previous AES Key-Update as follows:

Inputs: Plaintext, n 64-bit values {P1, P2, . . . , Pn}, and Key, K (the KEK).
Outputs: Ciphertext, (n+1) 64-bit values {C0, C1, . . . , Cn}.
1) Initialize variables:
    Set A=IV, an initial value
    For i=1 to n
        R[i]=P[i]
2) Calculate intermediate values:
    For j=0 to 5
        For i=1 to n
            B=AES(K, A|R[i])
            A=MSB(64, B)^t where t=(n*j)+i
            R[i]=LSB(64, B)

3) Output the results:
   Set C[0]=A
   For i=1 to n
      C[i]=R[i]
Where the values are defined as:

| | |
|---|---|
| AES(K, W) | Encrypt W using the AES codebook with key K |
| AES-1(K, W) | Decrypt W using the AES codebook with key K |
| MSB(j, W) | Return the most significant j bits of W |
| LSB(j, W) | Return the least significant j bits of W |
| B1 ^ B2 | The bitwise exclusive or (XOR) of B1 and B2 |
| B1 \| B2 | Concatenate B1 and B2 |
| W | The MIXKEYN |
| K | The MIXKEYN |
| n | The number of 64-bit key data blocks |
| s | The number of steps in the wrapping process, s = 6n |
| P[i] | The ith plaintext key data block |
| C[i] | The ith ciphertext data block |
| A | 64-bit concatenation of M\|U |
| R[i] | An array of 64-bit registers where i = 0, 1, 2, . . . , n |
| A[t], R[i][t] | The contents of registers A and R[i] after encryption step t. |
| IV | The 64-bit initial value used during the wrapping process. |
| M | A 32 bit constant: 83B2B83B |
| U | A 32 bit counter that increments to the MUV of the outputted (N + 1)key: 00000001 |

It is also possible to use a Public Key Exchange for MK authentication. NCM does not actively authenticate endpoints, such as the first and second communications device 24,28 as can be done in transactional public key negotiation. This is similar to pre-shared key model, where the provisioning of the key material is presumed to be source authenticated. While there are many uses where source authentication is an acceptable approach, this enhanced communications system 20 as described allows for transactional authentication. In a conventional bidirectional public key exchange, there is normally a variant of a sender's private key or certificate signed hash payload, optionally encrypted with the public key of the recipient, or an exchange of values dependent on the possession of a unique private key at each origin. In either case, this has the effect of allowing a bidirectional data exchange to authenticate the participants with each other in the establishment of a communications channel.

Users of this public key exchange, whether based in discrete logarithm, prime factorization, or elliptic curve, employ trapdoor functions that rely on complex math functions. If sufficiently powerful quantum computers are employed in the future, the underlying math of current asymmetric computing (and public key cryptography) is at risk. Specifically, if a public key of a small sized key pair is known, then a cryptographically relevant quantum computer may be able to derive the private key, invalidating public key crypto trust. This is not the case for symmetric cryptography (such as AES), where sufficient key size, e.g., 256-bit keys, is deemed sufficient for near-medium term time periods to thwart quantum crypto attacks.

Using CNSA (CNSSP-15) recommended key size values of RSA/DH>=3072 bits or Ellipitic curve>=P-384 should still provide adequate interim protection if endpoint authentication is desirable, using the following methodology, at the same level of QR risk to conventional transactional key agreement protocols.

The signed hash of the embedded KSP (using private key or certificate of sender) provides source authentication for the shared referenced (MK). From that point, any data encrypted with the trusted MK as a component to the decryption operation can be trusted to have originated at the source if the source private key is not compromised.

The key agreement, generation, and encryption using NCM and mixkey can be implemented as a hardware or software module. An application programming interface (API) or interface control document schema (ICD) may be defined in a communications device 24,28, for example, to allow the communications system 20 to call in with the remote shared key security parameters (KSP) to source or respond to the encryption/decryption operation with the first traffic encryption key (TEK). The MK is stored in volatile memory for added anti-tamper protection.

There may be alternate implementations of NCM that use different sizes of N and M, as well as different definitions of offsets (e.g., bit, nibble, byte, word index locations) and selection mechanisms (such as environmental input, metadata, derivation of hash from user or machine input, etc.). As an example, it may be possible to define a key derivation passphrase, "the dog is quick," which the first processor 34 at the first communications device 24 may hash to: 5FCEF367FB916A518A5DB95D5DA5E5BF0B0FFF-9524D8CE6A6D2D70F491A7686. That hash is then used to index to 16 (sixteen) 256-bit strings defined at 65,536 16-bit offsets in a circular 2^20 (1 Mbit) shared digital random number-based SEEDSET buffer as input into the one-way function to generate a 256-bit TEK as the final key [65,536-Choose-16]. This is preferable to a direct password based key derivation function (PBKDF), as the key material originates with the highly entropic DRBG based bits, not from a deterministic function applied to potentially biased limited or human input.

It is possible to include Iridium Enhanced Short Burst Data (ESBD) traffic encryption using NCM with the CV array 200. For ESBD, one mechanism could be for an end-user device (EUD), for example, the first communications device 24, to provide the MUV as part of a mobile-originated (MO) message during registration with the Iridium system. The count can be tracked mod 128 as a 16-bit value. This will allow for rollover as updates increment, with the distant end such as the second communications device 28 able to discern the correct update count, calibrated to the next 128-bit offset of the last known update count, which assumes that the communications system 20 will reboot less than 127 times without an Iridium registration. This can be concatenated with the CVI to define the active key. ESBD can prepend the six bytes to a message to define the key agreement. The MUV value may be constant for each power cycle or other defined period, and may or may not be included when unchanged from prior traffic. The MUV/CVI can also be used for key agreement as a mobile terminated (MT) ESBD message to one of the communications devices 24,28 from an outside sender.

The MK may be defined to be device specific, which enhances data confidentiality, protecting the compromise of a specific communications device 24,28 from compromising the secrecy of future ciphertext. It may also be a common provisioned value for multiple broadcast recipients, with greater risk. In that case an optional device specific key (DSK) may be implemented as a cover key for the MK to other devices, which can be used to refresh the base MK via an exception message individually distributed to the other communication devices 24,28 if one is compromised.

A provision may be made for common-keyed communications devices to support an MT message to command a special AES key-update of the MK with a unique variable "AZ" to be included in the message, followed by reset. This has the effect of making zero the crypto capability of the device, since it can no longer be used for common-keying updates. Optionally, it can be OTAR (over-the-air rekey) to unzeroize by the sending of DSK encrypted ciphertext of the synchronized MK at any point the communications device may regain trust. Each increment of the MUV provides back-traffic protection, regardless of whether the MK is common-keyed or device-specific keyed.

The communications system 20 may incorporate ESBD out-of-band key agreement. For communication devices 24,28 that support both Global Data Broadcast (GDB) and ESBD, an alternate NCM key agreement mechanism could use GDB broadcast of CVI to communications devices 24,28 in a GDB geographically pre-defined delivery area. The ESBD MO messages could then use an 8-bit hash synchronization value of the CVI on each message to indicate the CVI in use.

It is also possible for the communications system 20 to use GDB traffic encryption using NCM. For GDB, one mechanism would be for the sender, such as the first communications device 24, to provide the MUV as part of an mobile-terminated (MT) message during GDB broadcast. The count can be tracked mod 128 as a 16-bit value. This will allow for rollover as updates increment, with the distant end, such as the second communications device 28, able to discern the correct update count, calibrated to the next 128 bit offset of the last known update count. Since GDB is Rx (receive) only for EUDs, the MUV will be incremented to the granularity of PFS desired balanced against traffic broadcast density. The MUV can be concatenated with the CVI to define the active TEK.

The MK may be defined to be device specific, which enhances data confidentiality, protecting the compromise of a specific communications device 24,28 from compromising the secrecy of future ciphertext. It may also be a common provisioned value for multiple broadcast recipients, with greater risk. In that case, a device specific key may be implemented to refresh the base MK via an exception message individually distributed to the other EUDs if one is compromised.

A provision may be made for common-keyed devices to support a device specific MT message to command a special AES key-update of the MK with a unique variable "AZ" to be included in the message, followed by a reset. This has the effect of zeroizing the crypto capability of a communications device 24,28, since it can no longer be used for common-keying updates. Optionally, it may include OTAR (over-the-air rekey) to unzeroize by sending of ciphertext of the synchronized MK at any point the EUD might regain trust. Each increment of the MUV may provide back-traffic protection, regardless of whether the MK may be common-keyed or device-specific keyed.

The communications system 20 may be advantageous for high-latency, low bandwidth communications channels, such as narrowband satellite, e.g., Iridium, ESBD and GDB, emission sensitive endpoint communications such as LPD sensors and broadcast receivers, and unattended endpoint devices such as satellites. It is possible to provide an easy to incorporate physical hardware or software module for each communications device 24,28 in the communications system 20.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A communications system comprising:
   a first communications device comprising
      a first memory having stored therein a crypto-variable (CV) array having N number of crypto-variables (CVs), and
      a first processor cooperating with the first memory and configured to
         select M number of CVs from the CV array, the M number of CVs having identifiers associated therewith,
         generate a key using a cryptographic operation and based upon the selected M number of CVs,
         generate an encrypted message using the key, and
         transmit the identifiers of the selected M number of CVs and the encrypted message; and
   a second communications device comprising
      a second memory having stored therein the CV array, and
      a second processor cooperating with the second memory and configured to
         receive the identifiers for the selected M number of CVs and the encrypted message,
         generate the key using the cryptographic operation based upon the M number of CVs, and
         decrypt the encrypted message based upon the key; and
   wherein the first processor is configured to obtain a mixkey and generate the encrypted message further using the obtained mixkey, and the second processor is configured to decrypt the encrypted message further based on the obtained mixkey.

2. The communications system of claim 1 wherein the first processor is configured to generate a successor mixkey using the cryptographic operation and the obtained mixkey; and wherein the second processor is configured to generate the successor mixkey using the cryptographic operation and the obtained mixkey.

3. The communications system of claim 1 wherein the first processor is configured to delete the mixkey upon loss of power; and the second processor is configured to delete the mixkey upon loss of power.

4. The communications system of claim 1 wherein the first processor is configured to generate the mixkey based upon a mixkey sequence value and transmit the mixkey sequence value to the second processor; and wherein the second processor is configured to generate the mixkey based upon the mixkey sequence value.

5. The communications system of claim 1 wherein the first processor is configured to select different M numbers of CVs from the CV array for each communication session.

6. The communications system of claim 1 wherein the first communications device comprises an Internet of Things (IOT) control device; and wherein the second communications device comprises an IOT device.

7. The communications system of claim 1 wherein the first communications device comprises a first wireless transceiver coupled to the first processor; and wherein the second communications device comprises a second wireless transceiver.

8. A first communications device to communicate with a second communications device, the first communications device comprising:

a first memory having stored therein a crypto-variable (CV) array having N number of crypto-variables (CVs); and a first processor cooperating with the first memory and configured to select M number of CVs from the CV array, the M number of CVs having identifiers associated therewith, generate a key using a cryptographic operation and based upon the selected M number of CVs, generate an encrypted message using the key, and transmit the identifiers of the selected M number of CVs and the encrypted message to the second communications device; and wherein the first processor is configured to obtain a mixkey and generate the encrypted message further using the obtained mixkey.

9. The first communications device of claim 8 wherein the first processor is configured to generate a successor mixkey using the cryptographic operation.

10. The first communications device of claim 8 wherein the first processor is configured to delete the mixkey upon loss of power.

11. The first communications device of claim 8 wherein the first processor is configured to generate the mixkey based upon a mixkey sequence value and transmit the mixkey sequence value to the second processor.

12. The first communications device of claim 8 wherein the first processor is configured to select different M numbers of CVs from the CV array for each communication session.

13. The first communications device of claim 8 wherein the first communications device comprises an Internet of Things (IOT) control device.

14. The first communications device of claim 8 wherein the first communications device comprises a first wireless transceiver coupled to the first processor.

15. A communications method comprising:

operating a first communications device comprising a first memory having stored therein a crypto-variable (CV) array having N number of crypto-variables (CVs), and a first processor cooperating with the first memory to select M number of CVs from the CV array, the M number of CVs having identifiers associated therewith, generate a key using a cryptographic operation and based upon the selected M number of CVs, generate an encrypted message using the key, and transmit the identifiers of the selected M number of CVs and the encrypted message; and operating a second communications device comprising a second memory having stored therein the CV array, and a second processor cooperating with the second memory to receive the identifiers for the selected M number of CVs and the encrypted message, generate the key using the cryptographic operation based upon the M number of CVs, and decrypt the encrypted message based upon the key; and wherein the first processor is configured to obtain a mixkey and generate the encrypted message further using the obtained mixkey, and the second processor is configured to decrypt the encrypted message further based on the obtained mixkey.

16. The communications method of claim 15 wherein the first processor is configured to generate a successor mixkey using the cryptographic operation and the obtained mixkey; and wherein the second processor is configured to generate the successor mixkey using the cryptographic operation and the obtained mixkey.

17. The communications method of claim 15 wherein the first processor is configured to delete the mixkey upon loss of power; and the second processor is configured to delete the mixkey upon loss of power.

18. The communications method of claim 15 wherein the first processor is configured to generate the mixkey based upon a mixkey sequence value and transmit the mixkey sequence value to the second processor; and wherein the second processor is configured to generate the mixkey based upon the mixkey sequence value.

19. The communications method of claim 15 wherein the first processor is configured to select different M numbers of CVs from the CV array for each communication session.

20. The communications method of claim 15 wherein the first communications device comprises an Internet of Things (IOT) control device; and wherein the second communications device comprises an IOT device.

21. The communications method of claim 15 wherein the first communications device comprises a first wireless transceiver coupled to the first processor; and wherein the second communications device comprises a second wireless transceiver.

* * * * *